United States Patent
Komatsu

(10) Patent No.: US 9,251,589 B2
(45) Date of Patent: Feb. 2, 2016

(54) DEPTH MEASUREMENT APPARATUS, IMAGE PICKUP APPARATUS, AND DEPTH MEASUREMENT PROGRAM

(71) Applicant: CANON KABUSHIKI KAISHA, Tokyo (JP)

(72) Inventor: Satoru Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 13/869,232

(22) Filed: Apr. 24, 2013

(65) Prior Publication Data

US 2013/0307966 A1    Nov. 21, 2013

(30) Foreign Application Priority Data

May 17, 2012    (JP) .................................. 2012-113780

(51) Int. Cl.
*H04N 13/02*    (2006.01)
*G06T 7/00*    (2006.01)
*H04N 13/00*    (2006.01)

(52) U.S. Cl.
CPC ..... *G06T 7/0069* (2013.01); *G06T 2207/10016* (2013.01); *H04N 13/0221* (2013.01); *H04N 13/0296* (2013.01); *H04N 2013/0081* (2013.01)

(58) Field of Classification Search
CPC .................... H04N 213/0081; H04N 13/0055; H04N 13/0221; G06T 7/0069; G06T 2207/10016
USPC .......................................................... 348/50
See application file for complete search history.

(56) References Cited

U.S. PATENT DOCUMENTS

| | | | | |
|---|---|---|---|---|
| 2011/0222734 | A1* | 9/2011 | Angot et al. | 382/106 |
| 2011/0267508 | A1* | 11/2011 | Kane et al. | 348/241 |
| 2012/0200673 | A1* | 8/2012 | Tagawa et al. | 348/46 |
| 2013/0188019 | A1* | 7/2013 | Christopher et al. | 348/46 |

FOREIGN PATENT DOCUMENTS

JP    2010-117593 A    5/2010

OTHER PUBLICATIONS

R. Achanta et al., "SLIC Superpixels", EPFL Technical Report 149300, Jun. 2010.

\* cited by examiner

*Primary Examiner* — Michael Lee
(74) *Attorney, Agent, or Firm* — Fitzpatrick, Cella, Harper & Scinto

(57) ABSTRACT

A depth measurement apparatus calculates depth information on a subject in an image by using a plurality of images having different blurs taken under different imaging parameters, and includes a region segmentation unit that segments at least one of the images into regions based on an image feature amount, wherein in each of the regions pixels are presumed to be substantially equal in depth to the subject, and a depth calculation unit that calculates a depth for each region resulting from the segmentation by the region segmentation unit and serving as a processing target region for depth calculation, and sets the calculated depth as the depth of the processing target region.

13 Claims, 9 Drawing Sheets

DEPTH MEASUREMENT APPARATUS, IMAGE PICKUP APPARATUS, AND DEPTH MEASUREMENT PROGRAM

BACKGROUND OF THE INVENTION

1. Field of the Invention

The present invention relates to a technology for measuring depth information on a subject in an image by using image information.

2. Description of the Related Art

Conventionally, as a method for acquiring the depth of an imaging scene from an image acquired by an image pickup apparatus, a depth from defocus (DFD) method is proposed. In the DFD method, a plurality of images having different blurs are acquired by controlling imaging parameters of an image pickup optical system, and the correlation value of the mutual blurs is calculated on a per pixel basis in the plurality of images. In a case where only one pixel is used in depth calculation, the spread of the blur becomes obscure or the depth calculation becomes unstable due to a noise, and hence the correlation value is calculated with surrounding pixels included in the calculation. Finally, by using the relationship between the blur caused by the image pickup optical system and a subject depth, depth information on the subject is calculated based on the calculated correlation value of the blur. The DFD method has advantages that the depth can be calculated using one image pickup system, and a depth map can be calculated because the DFD method allows the calculation of the depth for each pixel.

However, there has been a problem that a processing time is significantly increased when the number of pixels for depth calculation is increased. In addition, in a case where the depth calculation is performed by using the surrounding region of the pixel for depth calculation, there has been a problem that accuracy is reduced when a plurality of depths are present in the surrounding region used in the depth calculation.

In view of the above problems, in Japanese Patent Application Laid-open No. 2010-117593, the number of redundant depth measurement points is reduced by segmenting an input image into regions and changing the density of the depth measurement point according to the importance of the region. With this, an increase in processing time is suppressed. In this operation, the importance is determined by using a facial recognition function and the region segmentation is performed.

An example of a region segmentation method that does not use the facial recognition function is described in "R. Achanta, et al., 'SLIC Superpixels', EPFL Technical Report no. 149300, June 2010". In this document, the region segmentation is performed by setting the center point in each region resulting from the region segmentation and determining which center point of the surrounding region a target pixel is close to by using a pixel depth from the center point and a depth in a color space as parameters.

However, in Japanese Patent Application Laid-open No. 2010-117593, although an increase in processing amount is prevented by performing the region segmentation and changing the number of depth measurement points according to the importance of the region, in a case where the depth map of all pixels is needed, all pixels have to be measured so that the processing amount cannot be suppressed.

In addition, although the number of depth measurement points is changed according to the importance of the region, the shape of the region is rectangular, and hence there is a problem that depth measurement accuracy is reduced in a case where objects having different depths are included in the rectangular region.

SUMMARY OF THE INVENTION

In view of the above problems, an object of the present invention is to provide a depth measurement technology in which it is possible to perform depth measurement with high accuracy even when subjects having different depths are present in an image, and a processing amount is small.

One aspect of the present invention is a depth measurement apparatus for calculating depth information on a subject in an image by using a plurality of images having different blurs taken under different imaging parameters, the apparatus comprising: a region segmentation unit configured to segment at least one of the images into regions based on an image feature amount, wherein in each of the regions pixels are presumed to be substantially equal in depth to the subject; and a depth calculation unit configured to calculate a depth for each region resulting from the segmentation by the region segmentation unit and serving as a processing target region for depth calculation, the depth calculation unit further adapted to set the calculated depth as the depth of the processing target region.

Another aspect of the present invention is an image pickup apparatus comprising: an image pickup unit; and the above-described depth measurement apparatus, wherein the depth measurement apparatus is configured to calculate depth information on a subject in an image based on a plurality of images having different blurs taken under different imaging parameters by using the image pickup unit.

Still another aspect of the present invention is a non-transitory computer readable medium storing thereon a program for causing a computer to calculate a depth of a subject in an image by using a plurality of images having different blurs photographed under different imaging parameters, wherein the program causes the computer to execute: a region segmentation step of segmenting at least one of the images into regions based on an image feature amount, wherein in each of the regions pixels are presumed to be substantially equal in depth to the subject; and a depth calculation step of calculating a depth for each region resulting from the region segmentation and serving as a processing target region for depth calculation, and setting the calculated depth as the depth of the processing target region.

According to the present invention, it is possible to perform the depth measurement with high accuracy even when subjects having different depths are present in the image and perform the depth measurement with a small processing amount.

Further features of the present invention will become apparent from the following description of exemplary embodiments with reference to the attached drawings.

DESCRIPTION OF THE EMBODIMENTS

First Embodiment

Hereinbelow, a description will be given of preferred embodiments of the present invention with reference to the drawings.

A first embodiment of the present invention is an image pickup apparatus 100 including a depth measurement apparatus 110. The depth measurement apparatus 110 is an apparatus that acquires a plurality of (e.g., two) images picked up by the image pickup apparatus 100 and calculates based on the images depth information on a subject at a plurality of positions in the image. Note that the depth information on the subject may be any information as long as the information is associated with the distance to the subject (depth distance). For example, a depth on an object side (a distance between the image pickup apparatus 100 and the subject, a distance between a focus position and the subject, or the like), a depth on an image surface side (a defocus amount or the like), or an index value (score) obtained by depth calculation according to a DFD method may also be used as the depth information on the subject.

Figure 1:
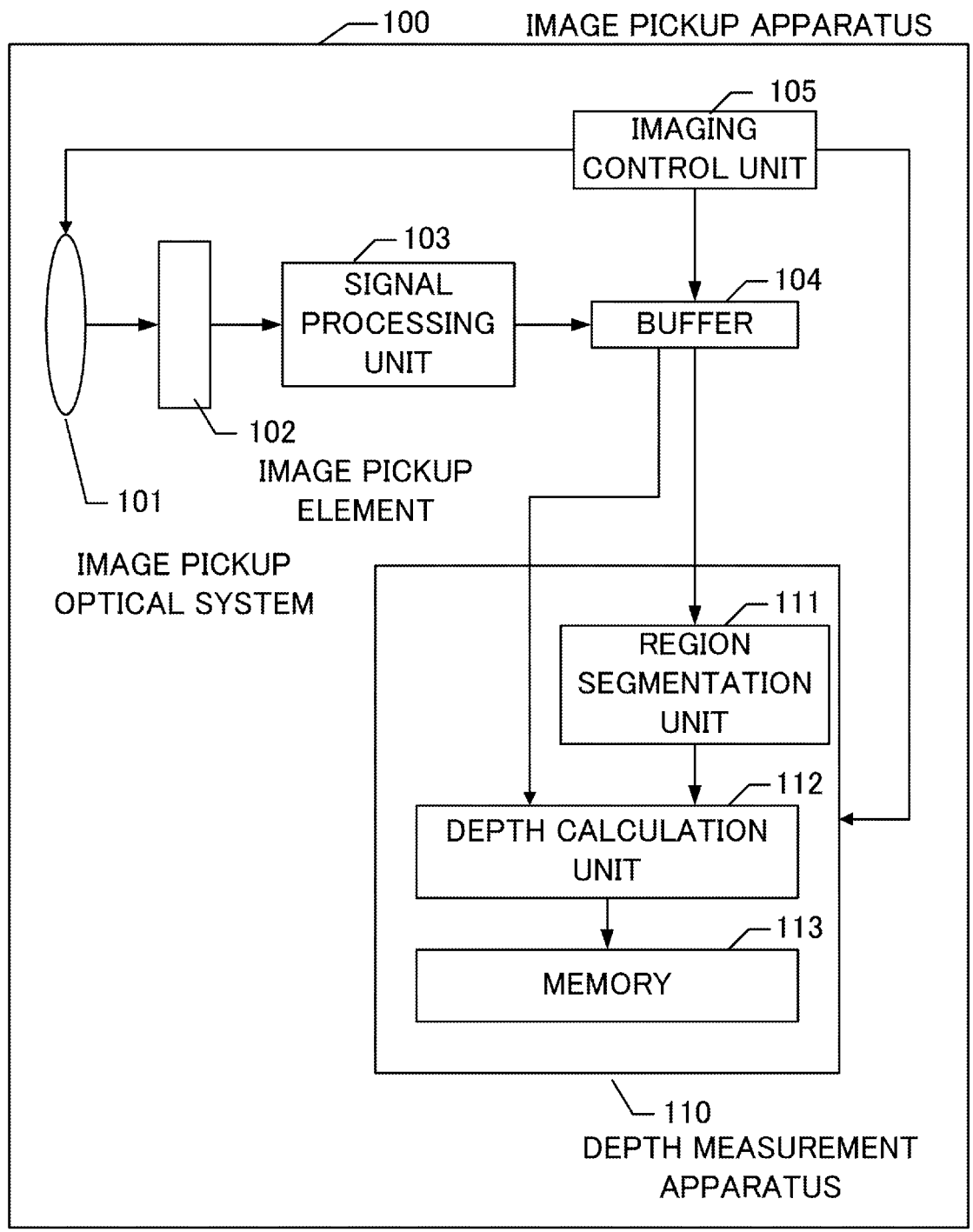
FIG. 1 is a block diagram showing the configuration of an image pickup apparatus according to a first embodiment.

FIG. 1 shows the configuration of the image pickup apparatus 100 according to the first embodiment. The image pickup apparatus 100 is constituted by an image pickup optical system 101, an image pickup element 102, a signal processing unit 103, a buffer 104, an imaging control unit 105, and the depth measurement apparatus 110. In addition, the depth measurement apparatus 110 is constituted by a region segmentation unit 111, a depth calculation unit 112, and a memory 113.

Each of the signal processing unit 103, the imaging control unit 105, and the individual units of the depth measurement apparatus 110 may be implemented by a dedicated semiconductor integrated circuit. In addition, it may also be implemented by a digital signal processor (DSP), a micro processor unit (MPU), or a software program. Further, it may also be implemented by a combination thereof.

A detailed description will be given of the configuration of the image pickup apparatus according to the present invention.

The image pickup optical system 101 is a normal taking lens that is constituted by a plurality of lenses and images incident light on the image pickup element 102. The image pickup optical system 101 may be a fixed focal length lens or a zoom lens, and the present invention does not limit the kind of the image pickup optical system 101.

The image pickup element 102 may be a single-plate type image pickup element or a three-plate type image pickup element and, in a case where the image pickup element 102 is the single-plate type image pickup element, its color filter may be a RGB color filter of a Bayer array or a complementary color filter.

The signal processing unit 103 captures an image formed on the image pickup element and performs signal processing such as AD conversion, noise removal, demosaicing, brightness signal conversion, aberration correction, image magnification correction, and registration processing. The image after the signal processing is accumulated in the buffer 104. Herein, it is not necessary to perform all of the signal processing, and the processing necessary for the image used in depth measurement may be selectively performed. Therefore, the image accumulated in the buffer 104 may be an image before the demosaicing or an RGB image after the demosaicing. Further, the image accumulated in the buffer 104 may also be a YUV image. However, the signal processing that does not change blurring by the image pickup optical system 101 is appropriate, and the image in which a noise that affects the depth information calculation and the misregistration of a plurality of the images are corrected is especially appropriate. Furthermore, the image subjected to the normal signal processing may be stored separately in a memory that is not shown such that a taken image can be used for the generation of the image outputted by the normal image pickup apparatus.

The imaging control unit 105 performs control for taking a plurality of images required for the depth measurement by the depth measurement apparatus 110. The imaging control unit 105 performs control in which the first image is taken and stored after performing signal processing, the second image is taken after an imaging parameter is changed, the signal processing is performed on the second image similarly to the first image, and the second image is accumulated in the buffer 104. Further, the third or subsequent image is taken on an as needed basis. The imaging parameter to be changed includes the focus position of the image pickup optical system 101, the opening size of the diaphragm of the image pickup optical system 101, or the focal length of the image pickup optical system 101.

The buffer 104 is a memory in which image data required for the depth measurement by the depth measurement apparatus 110 can be temporarily stored. The image accumulated in the buffer 104 is used for the depth calculation by the depth measurement apparatus 110.

The depth measurement apparatus 110 segments the image into regions in arbitrary shapes each in which pixels are presumed to be substantially equal in depth to the subject based on at least one image accumulated in the buffer 104, and performs depth measurement processing using the DFD method on each of the regions resulting from the segmentation. The detail of each unit of the depth measurement apparatus 110 will be described below.

The region segmentation unit 111 segments the taken input image such that one region includes only pixels presumed to be substantially equal in depth to the subject. Note that the depth to the subject is unknown, and hence the segmentation is performed based on an assumption. The assumption is that, if one subject is separated from other subjects and the subject is segmented into minute regions in arbitrary shapes according to a difference in image feature in the subject, a possibility that the minute regions are equal in depth to the subject is high. That is, the region segmentation unit 111 calculates an image feature amount for each minute region (e.g., one pixel), and sets the group of the minute regions having similar image feature amounts as one region. Thus, since the region is determined as the set of the minute regions, the shape of the region in which pixels are substantially equal in depth to the subject (hereinafter referred to as a substantially equal depth region) does not have a predetermined shape such as a rectangular shape or the like, and the image can be segmented into the regions in the arbitrary shapes.

As the size of the substantially equal depth region is smaller, a probability that subjects having different depths are included in the region can be made lower. Consequently, in a case where a high-accuracy depth resolution is required, it is necessary to segment the subject into more minute regions. By changing the segmentation size, it is possible to perform the segmentation such that required depth calculation accuracy is satisfied. The detail of the image segmentation processing by the region segmentation unit 111 will be described later in detail.

The depth calculation unit 112 calculates the subject depth for each region resulting from the segmentation (hereinafter referred to as a segmentation region) outputted from the region segmentation unit 111 based on a plurality of images taken while the imaging parameter is changed. Specifically, the segmentation region set by the region segmentation unit 111 is set as a processing target region, and the depth calculation unit 112 calculates the subject depth of the processing target region by using the DFD method. Since the segmentation region is determined as the region in which pixels are presumed to be substantially equal in depth to the subject, the calculated depth can be regarded as the subject depth of all pixels in the segmentation region.

In the memory 113, the depth to the subject in the image calculated by the depth calculation unit 112 is stored.

Figure 2:
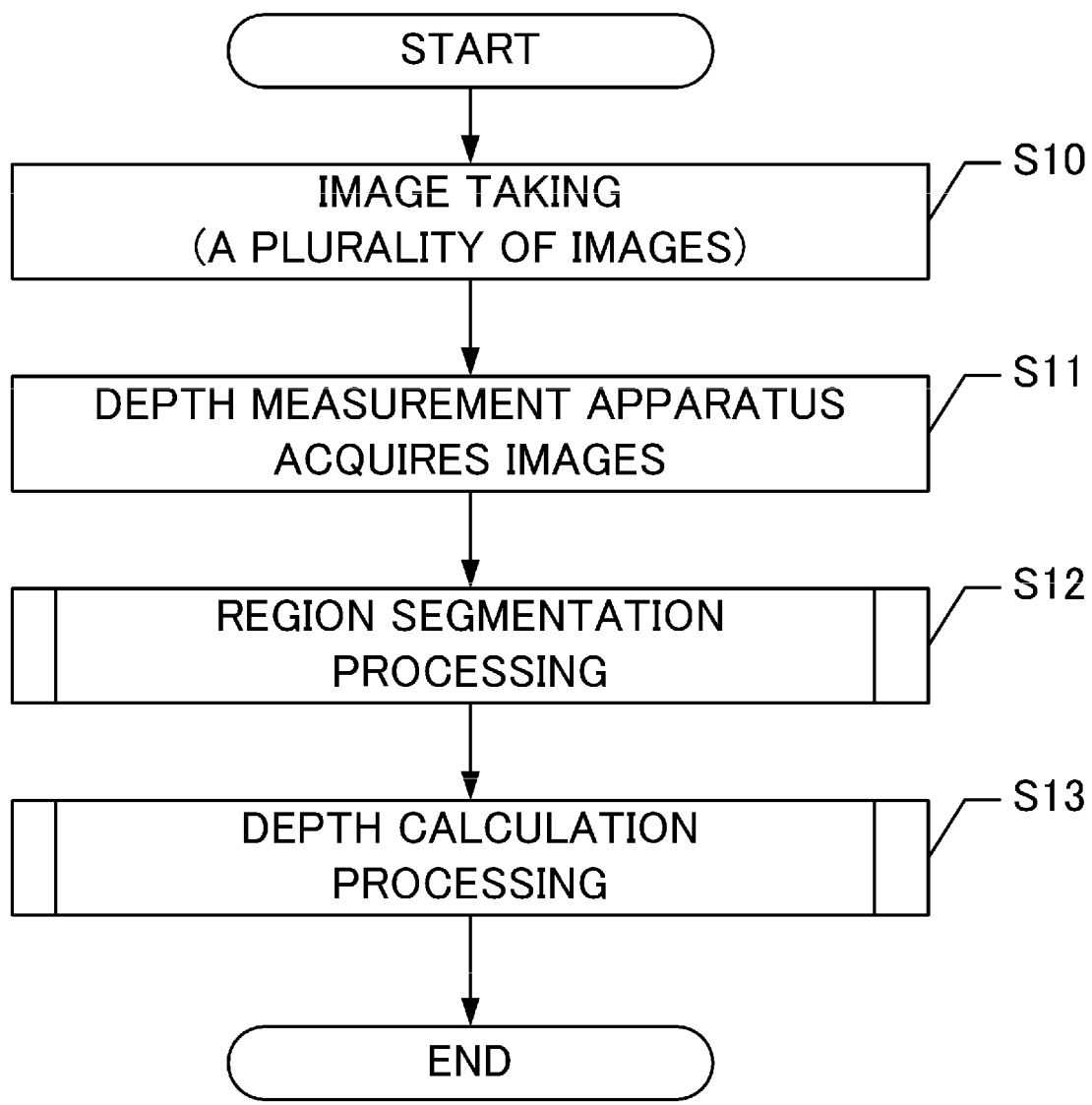
FIG. 2 is a flowchart showing the outline of depth measurement processing according to the first embodiment.

Hereinbelow, a description will be given of the flow of the processing performed by the image pickup apparatus 100 according to the present embodiment. FIG. 2 is a flowchart showing the broad flow of the processing performed by the image pickup apparatus 100. First, the imaging control unit 105 takes a plurality of images having different blurs while changing the imaging condition, and stores them in the buffer 104 (S10).

When the imaging is performed while the imaging parameter is changed and the images are accumulated in the buffer 104, the plurality of the images are sent to the depth measurement apparatus 110 and the depth calculation is started. Hereinbelow, a description will be given by using, as an example, a case where two images are taken in the present embodiment. The two taken images are designated by I1 and I2.

When the depth calculation processing is started, an image acquisition unit (not shown) of the depth measurement apparatus 110 acquires the images I1 and I2 from the buffer 104 (S11). Subsequently, the region segmentation unit 111 segments the image into the regions in arbitrary shapes each in which pixels are presumed to be substantially equal in depth to the subject based on one of the images (S12). In this region segmentation processing, the segmentation is performed such that, based on the image feature amount of each pixel, pixels each having the similarity of the image feature amount of not less than a predetermined value are merged into one region.

Figure 3:
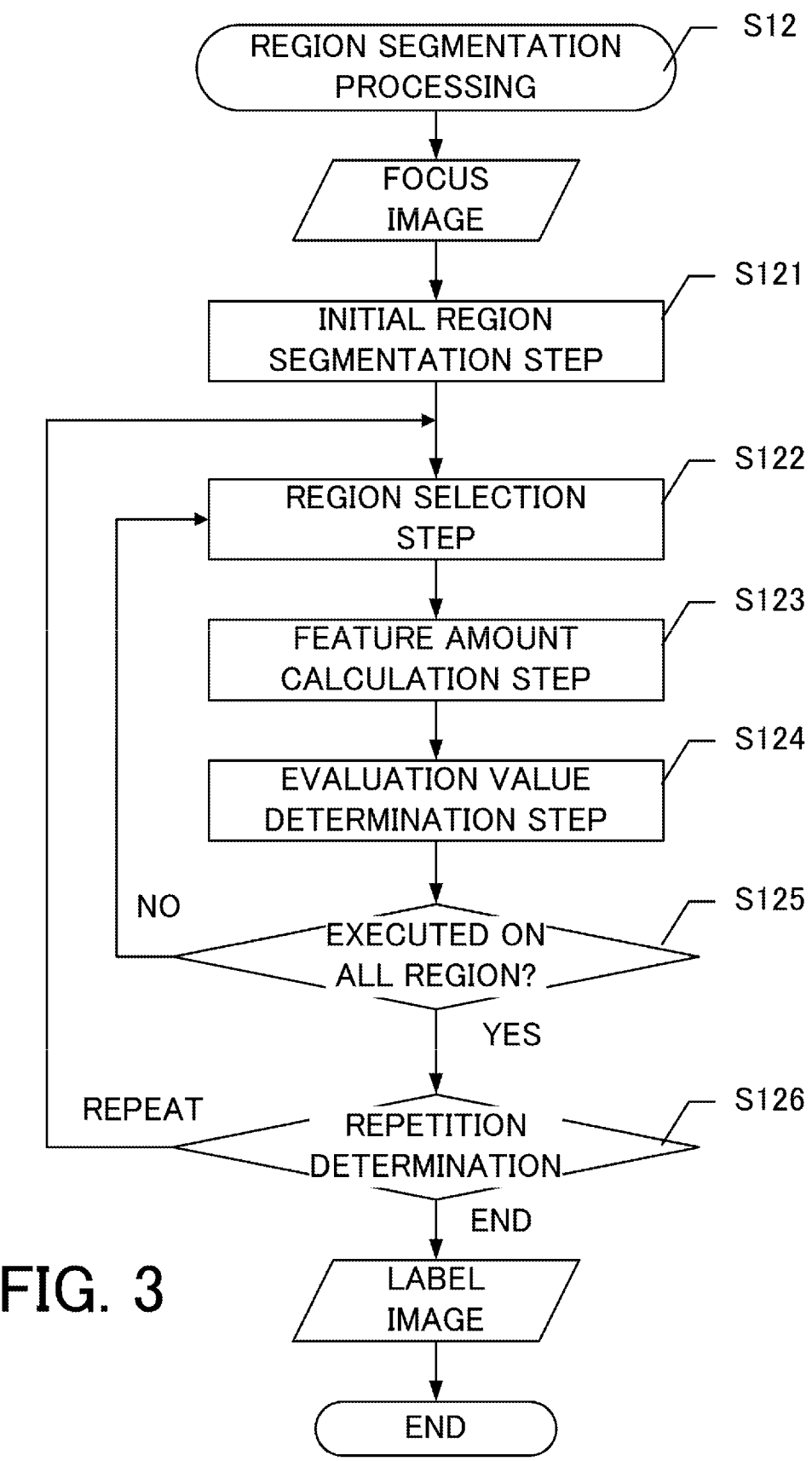
FIG. 3 is a flowchart showing region segmentation processing in the first embodiment.

The detailed operation of the region segmentation processing S12 performed by the region segmentation unit 111 will be described by using the flowchart of FIG. 3.

To the region segmentation unit 111, the image I1 as one of the taken images stored in the buffer 104 is inputted. It is preferable to determine, among the plurality of the images taken while the imaging parameter is changed, which image is to be used according to the changed imaging parameter in the following manner. That is, in a case where a plurality of images are taken while the opening size as the imaging parameter is changed, it is preferable to input the most deep-focus image (an image in which almost all pixels are in focus). On the other hand, in a case where a plurality of images are taken while the focus position as the imaging parameter is changed, it is preferable to input the image at the desired focus position obtained by AF.

Note that the region segmentation may also be performed based on one image obtained by merging at least two images among the plurality of the taken images instead of using one of the plurality of the taken images. As mergence processing, focus stacking is preferable. Focus stacking is processing that extracts regions in focus from a plurality of images and compounds a deep-focus image (an image in which almost all regions are in focus). The focus stacking is also referred to as depth synthesis.

An initial region segmentation step S121 is a processing step of segmenting the inputted image into rough regions. Simply speaking, an input image I is segmented at regular intervals using regions in a predetermined shape (e.g., a rectangular shape) in number equal to the number of segmentation regions predetermined according to the number of pixels of the input image or the like. Note that a label (number) indicative of which region the pixel belongs to is stored in association with each pixel of the input image. Hereinbelow, data including this label information is referred to as a label image L.

The subsequent processing S122 to S125 is performed on the region of the input image I1 corresponding to each label of the label image L segmented into the initial regions, and the label image is thereby updated such that the substantially equal depth region has the identical label.

In a region selection step S122, the region segmentation unit 111 selects the individual label region from the label image L segmented in the initial region segmentation step S121. At this point, the region segmentation unit 111 selects not only the label region but also its peripheral region (surrounding region). The surrounding region is preferably a region including the adjacent label region, and may have a rectangular shape of the fixed size or an arbitrary shape of the fixed size. In addition, the size of the shape may not be fixed, and may also be changed according to, e.g., the size of the label region. The region segmentation unit 111 extracts the region corresponding to the selected label region from the input image I1. The extracted image is referred to as a region image R.

In a feature amount calculation step S123, the region segmentation unit 111 calculates the feature amount of the image required to select pixels substantially equal in depth to the subject in the region image R. As the feature amount, at least one of pixel distance, distance in a color space, spatial frequency, edge, and brightness value is used. The relationship of the feature amounts to the depth will be described below.

The reason why pixel distance can be used as the feature amount of equal depth detection is that, in general, minute regions in a subject having a certain size with similar pixel distances can have similar depths to the subject. The pixel distance to a given pixel can be determined as the depth between the given pixel and the center or the center of gravity of the label region.

The reason why distance in the color space can be used as the feature amount of the equal depth detection is that a possibility that pixels in one subject that are equal in depth to the subject have similar colors is high. The distance in the color space to a given pixel can be determined as the distance in the color space between the given pixel and the center or the center of gravity of the label region.

The reason why spatial frequency can be used as the feature amount of the equal depth detection is that a possibility that one subject has similar spatial frequencies is high and a possibility that pixels equal in depth to the subject have the same spatial frequency is high.

The reason why edge can be used as the feature amount of the equal depth detection is that a possibility that different objects have different depths is high and a possibility that the depth change is clearly seen at the boundary of the object is high.

The reason why brightness value can be used as the feature amount of the equal depth detection is that a region in the same object that has similar pixel depths is considered to have similar brightness values. In addition, in a region where a sharp change in brightness value is seen, a possibility that pixels have different depths to the subject is high, and the same reason as the case of the edge applies.

Note that, although the region segmentation processing may be performed based on only one of the above feature amounts, in this case, the equal depth region may not be necessarily determined correctly. For example, even when the pixel distances are similar or even when the distances in the color space are similar, the depths to the subject are not necessarily the same. In addition, even when the spatial frequencies or the brightness values are similar, the depths to the subject are not necessarily the same. Further, the depths are not necessarily different due to the presence of the edge. Consequently, it is preferable to combine two or more of the plurality of the feature amounts. With this, it is possible to mutually compensate for insufficient information to perform the determination of the equal depth region more accurately.

Note that, in a case where the determination is performed by combining the plurality of the calculated feature amounts, in the present embodiment, the plurality of the feature amounts are unified and one evaluation value is calculated. In the unification method, it is preferable to weight the individual feature amounts and totalize them. The weighting amount to each feature amount differs depending on the dependence of the feature amount on the depth. Ideally, it is preferable that the weighting amount is changed depending on which feature amount the depth of the subject in the image is strongly related to. However, it is difficult to determine the relation and the determination of the relation is processing that requires a considerable calculation amount. Accordingly, it is preferable to use the fixed weighting amount irrespective of the subject in the image in order to simplify the processing.

In an evaluation value determination step S124, the region segmentation unit 111 compares the evaluation values calculated in the feature amount calculation step S123, determines which pixel in the region image R is included in the corresponding label region, and updates the label image L. Specifically, among pixels in the surrounding region of the label region, the pixel having the similarity to the evaluation value of the label region of not less than a predetermined value is determined as the pixel included in the label region. Note that, since the evaluation value is determined as the sum of the weighted image feature amounts, the evaluation value can be regarded as the similarity, and the pixel in the surrounding region having the same evaluation value can be determined as the pixel included in the label region.

As the evaluation value of the label region, the evaluation value at one point (e.g., the center, the center of gravity, or a predetermined point) of the label region may be used, or the average of the evaluation values of a part of or the entire label region may also be used.

In step S125, the region segmentation unit 111 determines whether or not the above processing is performed on all of the label regions. In a case where the processing is not performed on all of the label regions, the processing returns to step S122 again, and the processing is performed on the next label region. In a case where the processing is performed on all of the label regions, the processing advances to the subsequent repetition determination step S126.

In the repetition determination step S126, it is determined whether or not the processing in steps S122 to S125 described above is to be executed repeatedly. An example of the method for the repetition determination includes a method in which it is determined whether or not the processing is repeatedly executed the pre-specified number of times. An example of the method for the repetition determination also includes a method in which the change amount of the updated label image L is used as a determination value, and it is determined whether or not the determination value becomes not more than a threshold. For example, the position of the center of gravity of each segmentation region is determined as the determination value, and the processing may be repeated until a change in all of the positions of the center of gravity thereof becomes not more than the threshold (e.g., one pixel). Alternatively, the sum of the changes in all of the positions thereof is used as the determination value, and the processing may be repeated until the sum thereof becomes not more than the threshold.

Note that, in the above description, although the region segmentation is performed on a per pixel basis, the region segmentation may also be performed on a plurality of pixels basis (e.g., 2×2 pixels). In addition, as the image segmentation processing, there can be used any existing specific method such as a region growing algorithm, a split-and-merge method, or a clustering method. Further, the region segmentation may be performed on a reduced image and the obtained label image may be enlarged and used. In this case, a spatial resolution is degraded but the high-speed region segmentation is allowed.

It is rare that the input image I1 corresponding to the final label image L obtained as the result of convergence of the change amount of the label image L is segmented such that pixels having a plurality of the depths to the subject are present in one region. That is, each segmentation region in the final label image L is a region in which pixels are substantially equal in depth to the subject.

Returning to the description of the flowchart of FIG. 2, when the region segmentation processing S12 is ended, the region segmentation unit 111 outputs the generated final label image L to the depth calculation unit 112.

The depth calculation unit 112 calculates the depth by using the images I1 and I2 taken while the imaging parameter is changed, the label image L outputted from the region segmentation unit 111, and the imaging parameter (S13). In the present invention, the depth calculation using the DFD method is performed. In the present embodiment, the specific method of the DFD method will be described by using, as an example, a case where the DFD method is used in the frequency space.

Figure 4:
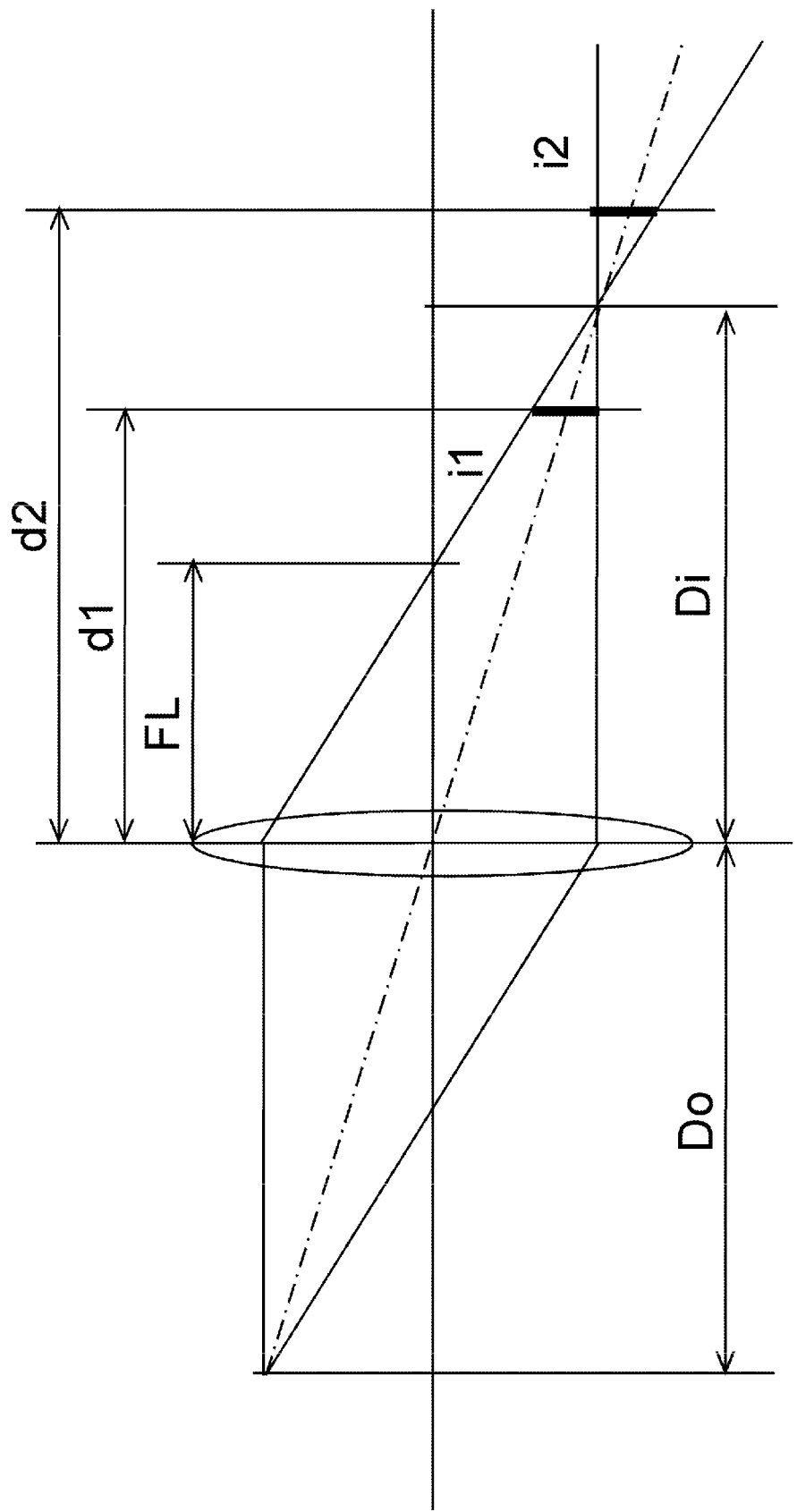
FIG. 4 is a view of geometric optics showing the principles of a DFD method.

A description will be given of the principles of the depth calculation by the known DFD method by using FIG. 4.

A depth Do to a depth measurement target object O can be determined by Expression 1 from the lens equation if a position Di where the object O forms an image on the image surface side is found. Herein, a focal length is designated by FL.

[Expression 1]

$$\frac{1}{D_o} + \frac{1}{D_i} = \frac{1}{FL} \qquad \text{(formula 1)}$$

However, Expression 1 can determine the depth to only the object that forms the image on the image pickup surface. An object of the DFD method is to measure the depth to the object that does not form the image on the image pickup surface. In the DFD method, the image formation position of the object is determined from the size of the blur (blur circle or circle of confusion) of the object projected on the image formation surface and the depth is calculated by substituting the image formation position into Expression 1. Herein, the image formation position is determined by utilizing that the circle of confusion is proportional to the image pickup surface and the image formation position.

Here, consideration is given to a case where a given object at a depth D1 is projected at an image pickup surface position d1. At this point, an image i1 is blurred and enlarged. When it is assumed that a point spread function at this point is PSF1 and a scene is s, the image i1 is represented by the convolution of the point spread function PSF1 and the scene s.

[Expression 2]

$$i1 = PSF1 \otimes s \quad \text{(formula 2)}$$

Herein, if it is possible to model PSF by using the circle of confusion as a parameter and estimate PSF from the image i1, the circle of confusion can be calculated. Further, the image formation position can be determined from the circle of confusion, and the depth can be calculated from Expression 1.

However, the scene s is unknown in Expression 2, and hence it is not possible to correctly determine the circle of confusion. To cope with this, imaging is performed at a different image pickup surface position d2. An image obtained at this imaging is designated by i2.

Herein, when it is assumed that Fourier transformation of the scene s is S, an optical transfer function obtained by performing the Fourier transformation of PSF1 of the first taken image is OTF1, and OTF of the second taken image is OTF2, the taken images are represented by OTF1×S and OTF2×S. The ratio between the two images is represented by the following expression.

[Expression 3]

$$\frac{\mathcal{F}\{i2\}}{\mathcal{F}\{i1\}} = \frac{\mathcal{F}\{PSF2 \otimes s\}}{\mathcal{F}\{PSF1 \otimes s\}} = \frac{OTF2 \cdot S}{OTF1 \cdot S} = \frac{OTF2}{OTF1} = OTF_r \quad \text{(formula 3)}$$

The ratio of OTF is calculated, which does not depend on the scene OTFr. It is possible to calculate the circle of confusion of the object O from Expression 1 and the geometric relationship in FIG. 4 and calculate the depth.

Figure 5:
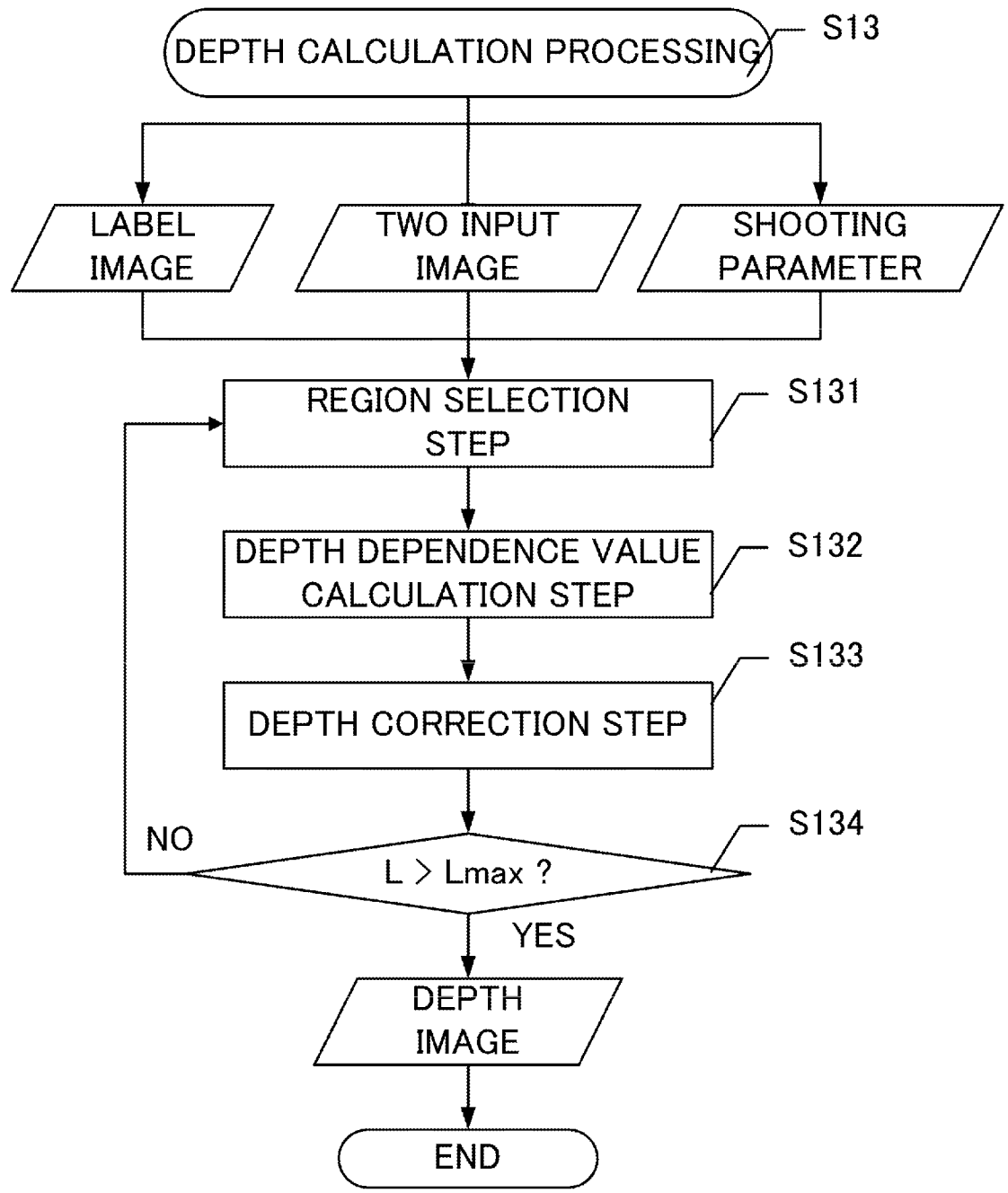
FIG. 5 is a flowchart of depth calculation processing in the first embodiment.

Hereinbelow, the detailed operation of the depth calculation processing performed by the depth calculation unit 112 will be described by using the flowchart of FIG. 5.

When the region segmentation is ended, the label image L, the two taken images I1 and I2 accumulated in the buffer 104, and the imaging parameter are sent to the depth calculation unit 112, and the depth calculation processing is started. Here, the imaging parameter is sent from the imaging control unit 105.

The depth calculation unit 112 performs processing in the following steps S131 to S134 in the order of the label number of the label image.

In a region selection step S131, when the label is specified, the regions corresponding to the label are extracted from the taken images I1 and I2. The extracted equal depth region images are designated by R1 and R2.

In a depth dependence value calculation step S132, the equal depth region images R1 and R2 are transformed into images in the frequency space by the Fourier transformation or the like, and spatial frequency images F1 and F2 are obtained. The depth dependence value is calculated from the spatial frequency images F1 and F2 by the DFD method. Herein, when the Fourier transformation is performed, since the equal depth region image has the arbitrary shape, a square image in which the equal depth region image can fit is prepared, and the equal depth region image is substituted into it. The length of one side of the square image is preferably a power of 2 in order to increase the speed of the Fourier transformation. Note that, when the equal depth region image is substituted into the square image, the region other than the selected arbitrary shape is filled with 0.

In a depth correction step S133, the depth dependence value is corrected based on the depth dependence value calculated in the depth dependence value calculation step S132 and the imaging parameter, and the depth to the subject is calculated.

In the depth correction step S133, the depth correction is performed by using a correction table prepared in advance. The OTFr value in a case where the imaging parameter is given and the depth corresponding to the OTFr value are stored in the correction table. When the imaging parameter and the depth dependence value OTFr are inputted, the depth correction step S133 selects the corresponding depth from the correction table and outputs the selected depth. Herein, the imaging parameter is information on the focal length and the focus position during the imaging.

The outputted depth dependence value differs depending on the DFD method, and hence the correction table needs to be prepared according to the method. The correction table may be held in the form of a function, or may also be held as a pre-calculated lookup table.

With the above processing, the depth of one equal depth region is determined and the calculated depth is substituted into the region corresponding to the label in a depth image.

In step S134, it is determined whether or not the label number reaches the largest label number in the label image. In a case where the label number does not reach the largest label number, the processing returns to the region selection step S131, the same processing is repeated, and the finally calculated depth image is stored in the memory 113 when the processing is performed on all of the substantially equal depth segmentation regions.

In the present embodiment, although the description has been given by using the depth measurement by the DFD processing performed on the image transformed into the frequency space image as the example, in general, the DFD method is the method for determining the depth by extracting the change of the blur from a plurality of the images taken while the imaging parameter is changed, and a plurality of methods are present. The present invention is not intended to limit the kind of DFD method but intended to improve the accuracy and the processing speed of any DFD method, and therefore can be applied to various DFD methods.

Thus, in the image pickup apparatus according to the present embodiment, in the depth information acquisition by the DFD method, the feature of the taken image is extracted, the taken image is segmented into the regions each in which pixels are presumed to be substantially equal in depth to the subject, the DFD processing is performed on each equal depth region, and one depth is calculated for each region. With this, it becomes possible to perform the depth calculation to all pixels with a small number of depth measurement points.

In addition, the shape of the equal depth region is not limited to the predetermined shape such as the rectangular shape or the like, and is selected as the region having the arbitrary shape formed of pixels presumed to be equal in depth to the subject based on the image feature amount by the region selection processing. In a case where the predetermined region such as the rectangular shape or the like is adopted, it is not possible to avoid the situation in which a plurality of subjects having different depths are present in one region in a region where the boundary of the subject does not match the shape of the segmentation region. In contrast, in the present embodiment, the segmentation is performed based on the arbitrary shape, it is possible to select the region formed of pixels equal in depth to the subject more reliably. With this, it becomes possible to improve the depth calculation accuracy at the boundary of the subject and the spatial resolution of the pixel direction of the depth image.

Second Embodiment

Figure 6:
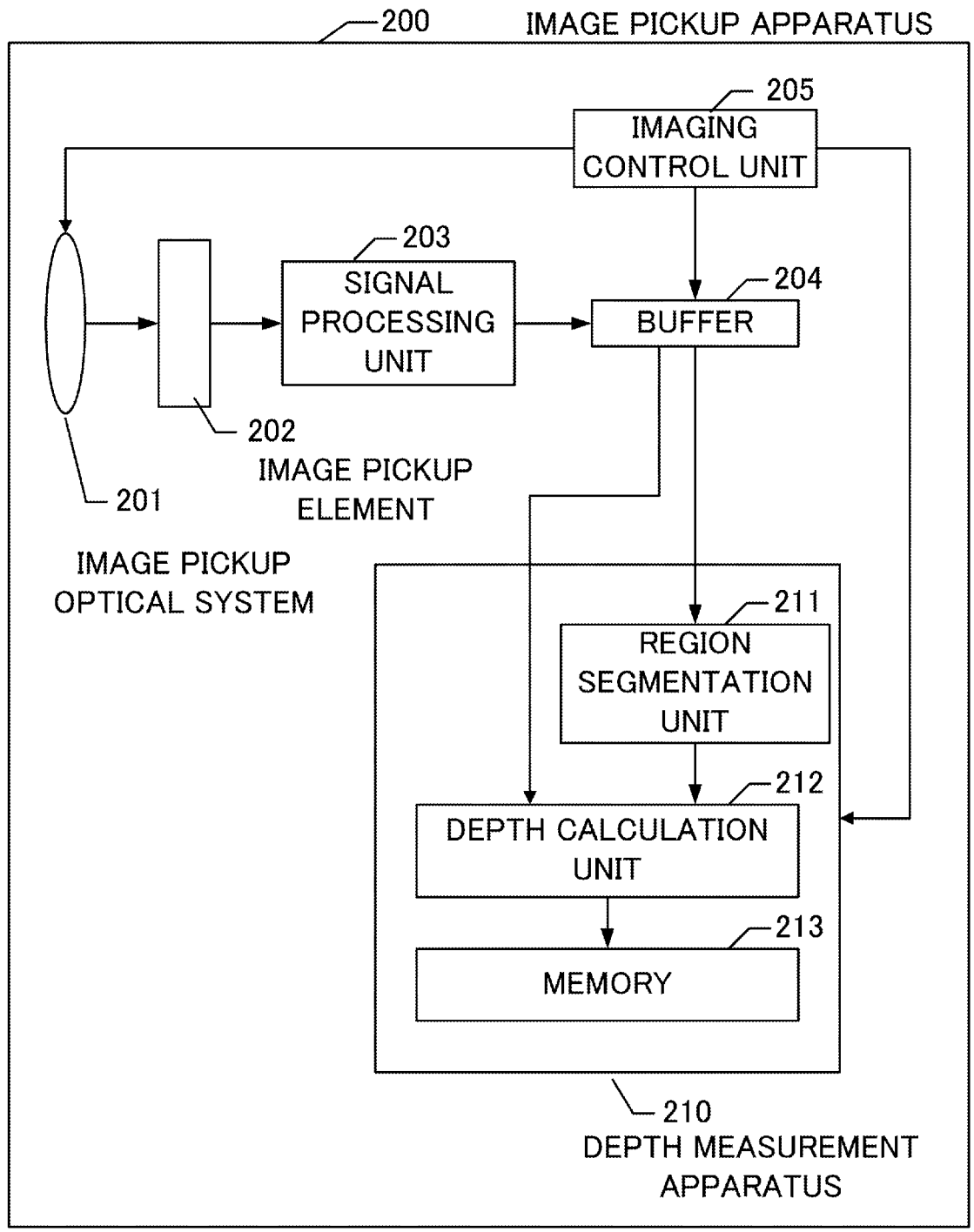
FIG. 6 is a block diagram showing the configuration of an image pickup apparatus according to a second embodiment.

As shown in FIG. 6, the configuration of an image pickup apparatus according to the present embodiment is the same as that of the first embodiment, but the present embodiment is different from the first embodiment in the region segmentation method and the depth calculation method. Specifically, the operation of each of a region segmentation unit 211 and a depth calculation unit 212 is different.

Hereinbelow, the operation of each of the region segmentation unit 211 and the depth calculation unit 212 that is different from the operation in the first embodiment will be described in detail.

Figure 7:
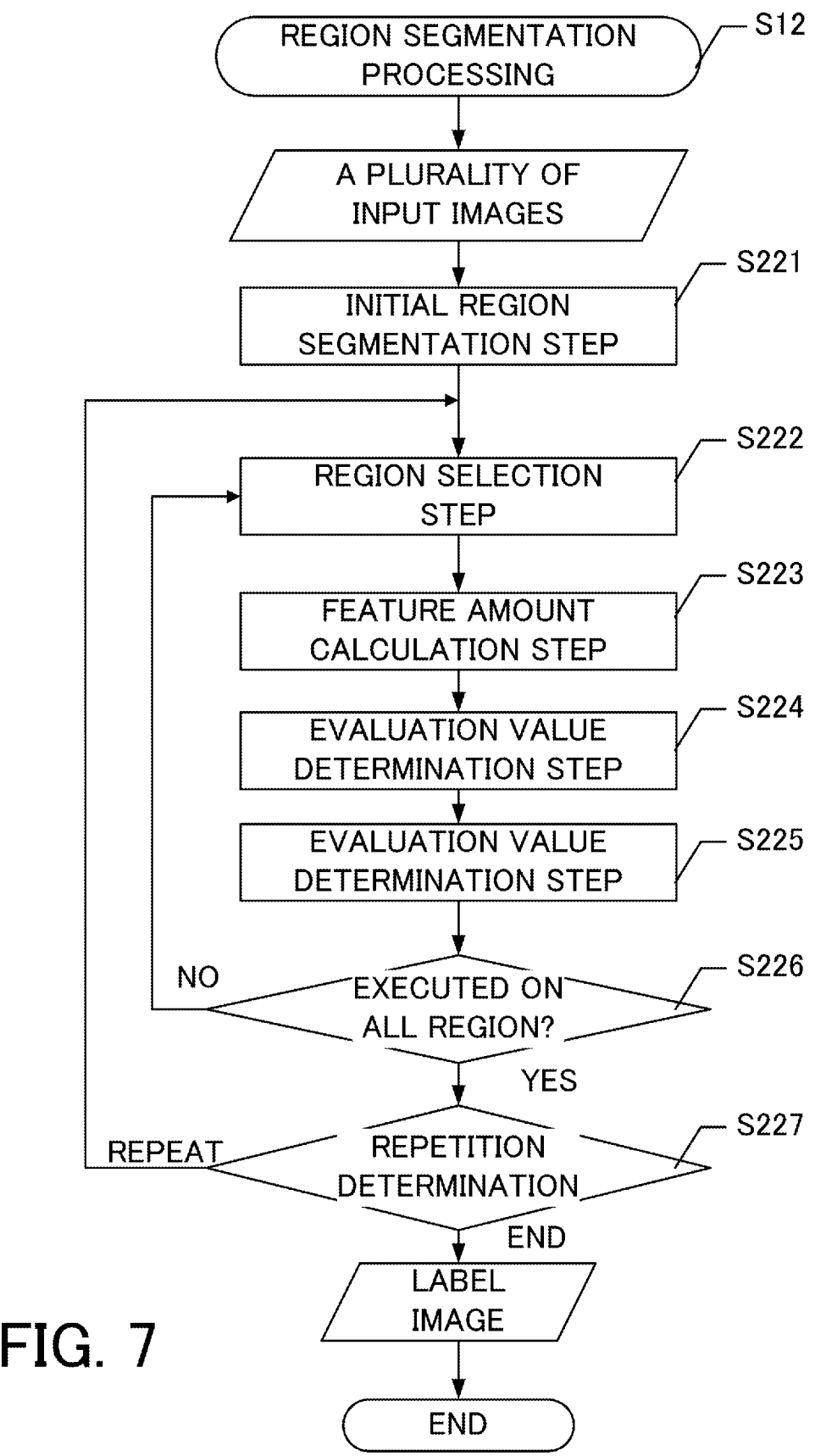
FIG. 7 is a flowchart of region segmentation processing in the second embodiment.

Unlike the first embodiment, the region segmentation unit 211 performs the region segmentation by using a plurality of taken images. In the present embodiment, a description will be given by using a case where two images are taken as an example. The flowchart of the region segmentation processing performed by the region segmentation unit 211 is shown in FIG. 7.

In each of an initial region segmentation step S221, a region selection step S222, a feature amount extraction step S223, and an evaluation value determination step S224, the same processing as in the first embodiment is performed, but the second embodiment is different from the first embodiment in that the above processing is performed on the two input images I1 and I2. Consequently, in the evaluation value determination step S224, the label region segmented as the region in which pixels are presumed to be substantially equal in depth to the subject from the input image I1 (first image) and the label region segmented as the region in which pixels are presumed to be substantially equal in depth to the subject from the input image I2 (second image) are obtained.

There is a possibility that the two label regions obtained in the evaluation value determination step S224 are different from each other. This is because, by changing the imaging parameter, one region is in sharper focus and the other region is blurred so that the blurs of the two regions are different from each other. A possibility that the selected region image of the image in focus has a sharp edge and the region segmentation is performed based on the edge is high, and there is a possibility that the selected region image of the other image is blurred, the boundary thereof is blurry, and the size thereof is larger.

Since the DFD method is used in the depth calculation, in the region closed by the edge, blurring in the vicinity of the edge cannot be obtained accurately. To cope with this, in a region comparison step S225, the sizes of the label regions are compared and, in a case where the sizes thereof are different from each other, a new label region is generated in consideration of the two regions and the label image is updated. At this point, in a case where the sizes of the two label regions are significantly different from each other, it is appropriate to set the size to an intermediate size between the sizes thereof. On the other hand, in a case where the difference thereof is a minute difference corresponding to the size of one pixel, it is appropriate to select the larger size.

The processing of the subsequent steps S226 and S227 is the same as the processing in the first embodiment. The region segmentation unit 211 finally outputs the label image L showing the segmentation of the substantially equal depth region determined from the two images I1 and I2.

The depth calculation unit 212 calculates the depth dependence value from the label image L calculated in the region segmentation unit 211 and the taken two images I1 and I2. The flowchart of the depth calculation processing performed by the depth calculation unit 212 is the same as the processing of the depth calculation unit 112 of the first embodiment shown in FIG. 5.

In the present embodiment, by performing the segmentation into the substantially equal depth regions by using the plurality of the taken images, it becomes possible to perform the segmentation while maintaining blur information required for the depth calculation by the DFD method especially in the boundary region of the subject. With this, it becomes possible to perform more stable depth calculation in the boundary region of the subject.

Third Embodiment

Figure 8:
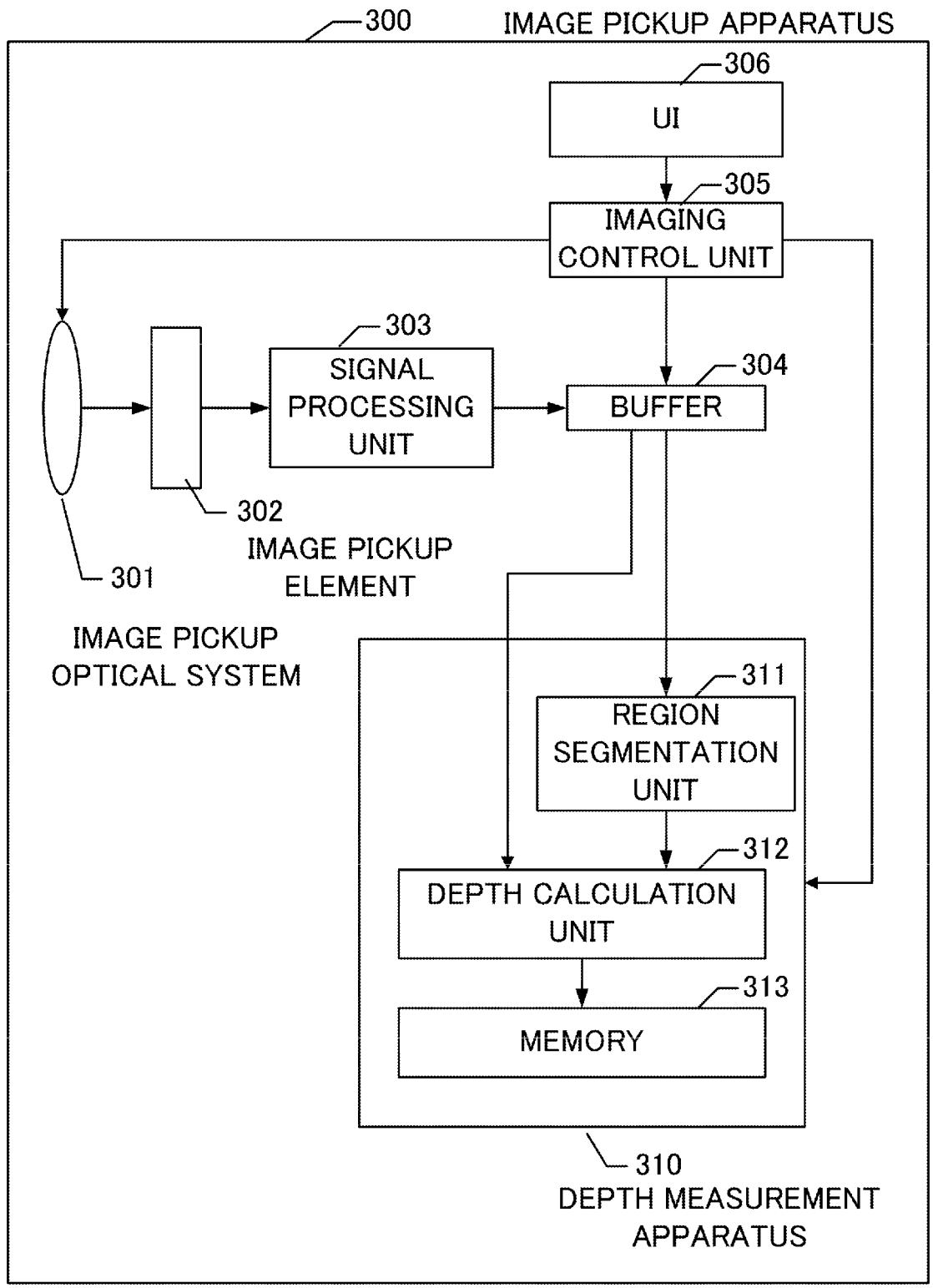
FIG. 8 is a block diagram showing the configuration of an image pickup apparatus according to a third embodiment.

As shown in FIG. 8, the configuration of the present embodiment is substantially the same as the first and second embodiments, but is different from the first and second embodiments in that the imaging control is performed from a user interface (UI) and the region segmentation is performed by using the imaging parameter. Specifically, the present embodiment is different from the first and second embodiments in the addition of a UI 306 and the operation of a region segmentation unit 311.

Figure 9:
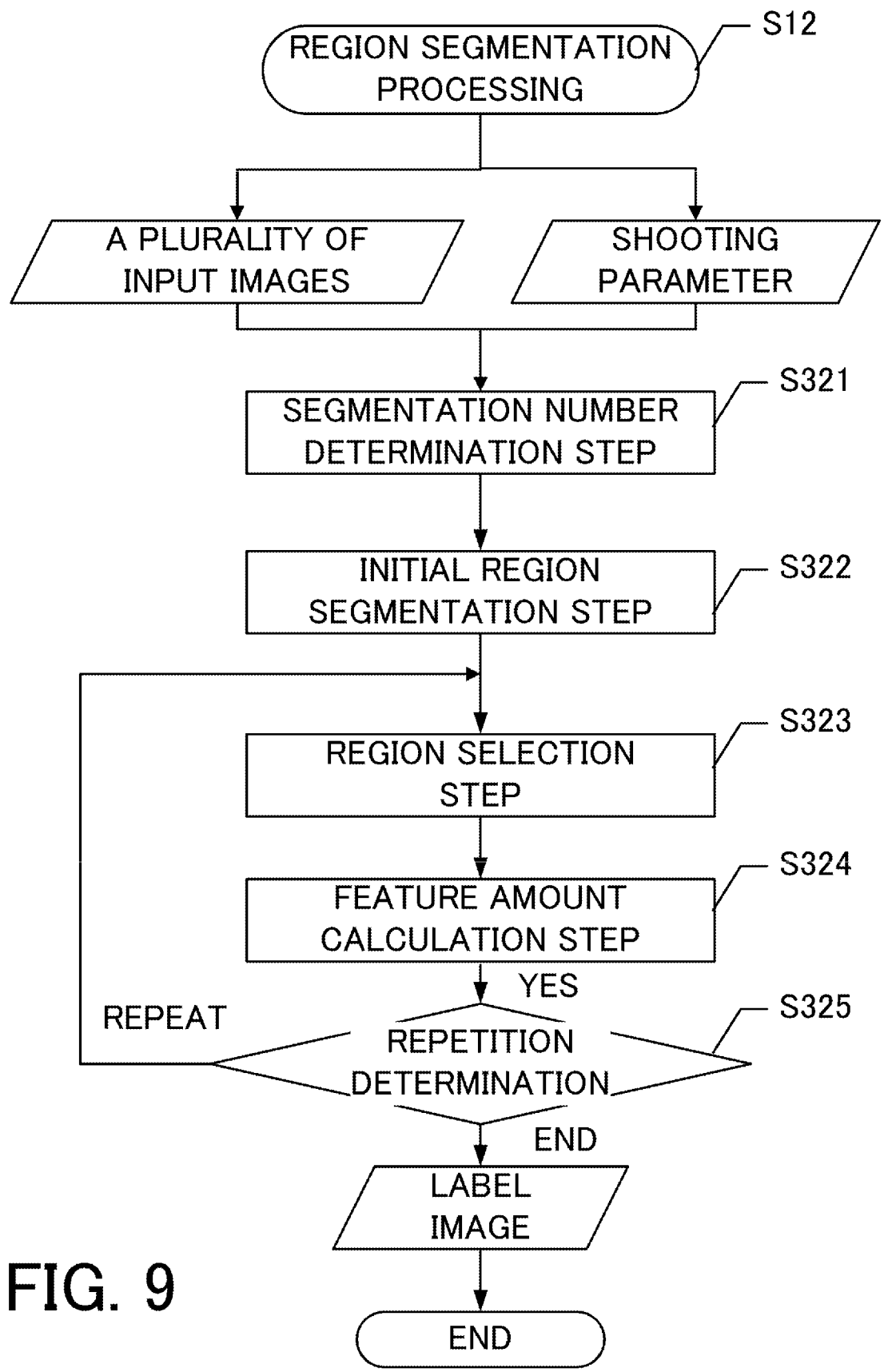
FIG. 9 is a flowchart of region segmentation processing in the third embodiment.

Hereinbelow, the operation of the region segmentation unit 311 that is different from the operations of the first and second embodiments will be described in detail. Although the segmentation is performed such that the number of regions resulting from the segmentation (hereinbelow referred to as the segmentation number) predetermined based on the total number of pixels of the image pickup element is satisfied in the first and second embodiments, in the present embodiment, the segmentation number is adaptively determined based on the imaging parameter. The flowchart of the region segmentation processing performed by the region segmentation unit 311 is shown in FIG. 9. In the flowchart, a segmentation number determination step is added before the initial region segmentation step. Although the flowchart shown in FIG. 9 is based on the first embodiment, the flowchart may be obtained by changing the flow of the second embodiment.

In a segmentation number determination step S321, the region segmentation unit 311 receives information on imaging conditions specified by a user with the UI 306 from an imaging control unit 105 as the imaging parameter. Herein, the information on the imaging conditions specified by the user includes the focal length, the focus position, and imaging scene setting information. The region segmentation unit 311 calculates the segmentation number based on the above information.

For example, in a case where the focal length is long and the focus position is close to a camera in a portrait scene setting, the imaging is presumed to be the close-up of, for example, a face and it is anticipated that objects other than the face are distant. In this case, it is desired to distinguish differences in depths to projections and depressions of eyes and a nose in the face. Therefore, by segmenting the image into small regions, the region segmentation responsive to a small depth change is performed.

On the other hand, in a case where the focal length is short and the focus position is far from the camera in a scenery imaging setting, it is presumed that depth scenery such as landscape of mountains is to be taken. In this case, it is necessary to calculate rough depths to trees and mountains instead of the small depth change, and hence the segmentation number is reduced and the image is segmented into large regions.

As in the above examples, although it is possible to presume the segmentation number from the information on the imaging conditions, there are cases where the scene presumed from the imaging conditions does not match the actual imaging scene. To cope with such cases, it is preferable that the user can set or correct the segmentation number by performing the input from the UI. That is, it is preferable to perform the region segmentation according to the segmentation number specified by the user.

In the specification of the segmentation number by the user, the input of the number may be directly received from the user. In this case, the region segmentation unit performs the region segmentation according to the inputted segmentation number.

However, with the input of the numerical value, it may be difficult for the user to understand the correlation of the segmentation number, segmentation speed, and segmentation result. To cope with this, a setting in which the depth calculation accuracy is prioritized and a setting in which the speed is prioritized may be prepared and the user may select the setting. In this case, the segmentation number corresponding to each setting is predetermined. The region segmentation unit performs the region segmentation according to the segmentation number based on the setting specified by the user. Note that the number of prepared settings is not limited to two and the number thereof may be any number.

Steps subsequent to the segmentation number determination step S321 are the same as those of the first and second embodiments.

In the present embodiment, by adaptively determining the region segmentation number from the imaging conditions, it becomes possible to perform the depth measurement with the optimum balance between the depth calculation accuracy and the processing speed. In addition, it becomes possible to easily change the depth calculation accuracy and the processing speed by the specification of the user.

Fourth Embodiment

In each of the first to third embodiments, although the description has been given of the example in which the DFD method in the frequency space is used, the DFD method in a real space can also be used in the present invention. In the present embodiment, a description will be given of a case where the depth measurement apparatus uses the DFD method in the real space.

When selected regions of the input images corresponding to a given label region selected by the region selection unit are designated by R1 and R2, a normalized cross-correlation NCC is calculated by the following expression.

[Expression 4]

$$NCC = \frac{\sum (R1 - \overline{R1})(R2 - \overline{R2})}{\sqrt{\sum (R1 - \overline{R1})^2 \Sigma (R2 - \overline{R2})^2}} \quad \text{(formula 5)}$$

The result is outputted as the depth dependence value. The processing of determining the depth to the subject from the depth dependence value is the same as the processing described in the first embodiment.

In each of the first to third embodiments, the square image has been generated and the arbitrary shape has been substituted into the square image for the Fourier transformation, it is not necessary to generate the square image in the present embodiment. In the present embodiment, it is possible to perform the depth calculation by the DFD method with the arbitrary shape, and it is possible to achieve reductions in processing time and memory amount. The calculation method of the depth dependence value according to the present embodiment can be combined with any of the first to third embodiments.

MODIFICATION

In the above description, although the description has been given by using, as an example, the case where the depth measurement apparatus is incorporated into the image pickup apparatus, this configuration is not essential. As long as a plurality of images having different blurs taken under different imaging parameters can be acquired, the depth measurement apparatus may be configured in any manner. For example, the depth measurement apparatus may be incorporated into a computer having the image pickup apparatus, acquire images picked up by the image pickup apparatus, and perform the depth calculation based on the acquired images. Alternatively, the depth measurement apparatus may be incorporated into a computer capable of network access wiredly or wirelessly, acquire a plurality of images via the network, and perform the depth calculation based on the acquired images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s).

This application claims the benefit of Japanese Patent Application No. 2012-113780, filed on May 17, 2012 which is hereby incorporated by reference herein in its entirety.

What is claimed is:

1. A depth measurement apparatus for calculating depth information of a subject in an image by using a plurality of images including a first image and a second image, the apparatus comprising:

a region segmentation unit configured to segment at least one of the images into regions based on an image feature amount, wherein, in each of the regions, pixels are presumed to be substantially equal in depth to the subject; and a depth calculation unit configured to calculate a depth for each region resulting from the segmentation by the region segmentation unit and serving as a processing target region for depth calculation, to set the calculated depth as the depth of the processing target region, wherein the depth calculation unit is further configured to calculate the depth based on data in a processing target region of the first image and data in a processing target region of the second image.

2. The depth measurement apparatus according to claim 1, wherein
the region segmentation unit is further configured to segment the image on the basis of regions in a predetermined shape,
to calculate image feature amounts of pixels in a region resulting from the segmentation and a region surrounding the same and to determine, among pixels in a surrounding region, a pixel included in the region resulting from the segmentation based on a similarity of the image feature amount for each of the regions resulting from the segmentation, and
to repeat the processing for each region resulting from the segmentation until a determination value indicative of a change amount of the region resulting from the segmentation becomes less than or equal to a predetermined threshold.

3. The depth measurement apparatus according to claim 1, wherein the image feature amount is at least one of pixel distance, distance in a color space, spatial frequency, edge, and brightness value.

4. The depth measurement apparatus according to claim 3, wherein the region segmentation unit calculates an evaluation value from a plurality of the image feature amounts and performs the region segmentation based on the evaluation value.

5. The depth measurement apparatus according to claim 1, wherein the region segmentation unit performs the region segmentation based on one of the plurality of images.

6. The depth measurement apparatus according to claim 1, wherein the region segmentation unit performs the region segmentation based on an image obtained by focus stacking performed by using at least two images of the plurality of images.

7. The depth measurement apparatus according to claim 1, wherein the region segmentation unit obtains a final result of the region segmentation from a result of the region segmentation performed based on a first image of the plurality of images and a result of the region segmentation performed based on a second image of the plurality of images.

8. The depth measurement apparatus according to claim 1, wherein the region segmentation unit determines a number of regions resulting from the segmentation by using at least one of a number of pixels, a focal length, a focus position, and an imaging scene setting.

9. The depth measurement apparatus according to claim 1, wherein the region segmentation unit performs the region segmentation according to a number of regions resulting from the segmentation specified by a user.

10. An image pickup apparatus comprising:
an image pickup unit; and
the depth measurement apparatus according to claim 1, wherein the depth measurement apparatus is configured to calculate depth information of a subject in an image based on a plurality of images having different blurs taken under different imaging parameters using the image pickup unit.

11. A non-transitory computer readable medium storing thereon a program for causing a computer to calculate a depth of a subject in an image by using a plurality of images including a first image and a second image, wherein the program causes the computer to execute:
a region segmentation step of segmenting at least one of the images into regions based on an image feature amount, wherein, in each of the regions, pixels are presumed to be substantially equal in depth to the subject; and
a depth calculation step of calculating a depth for each region resulting from the region segmentation and serving as a processing target region for depth calculation, and setting the calculated depth as the depth of the processing target region,
wherein, in the depth calculation step, the depth is calculated based on data in a processing target region of the first image and data in a processing target region of the second image.

12. The depth measurement apparatus according to claim 1, wherein the plurality of images are taken under different imaging parameters and have different blurs.

13. A depth measurement apparatus for calculating depth information on a subject in an image by using a plurality of images, the apparatus comprising:
a region segmentation unit configured to segment at least one of the images into regions based on an image feature amount, wherein, in each of the regions, pixels are presumed to be substantially equal in depth to the subject; and
a depth calculation unit configured to calculate a depth for each region resulting from the segmentation by the region segmentation unit and serving as a processing target region for depth calculation, and to set the calculated depth as the depth of the processing target region,
wherein the region segmentation unit is further configured to segment the image on a basis of regions in a predetermined shape,
to calculate image feature amounts of pixels in the region resulting from the segmentation and a region surrounding the same and to determine, among pixels in a surrounding region, a pixel included in the region resulting from the segmentation based on a similarity of the image feature amount for each of the regions resulting from the segmentation, and
to repeat the processing for each region resulting from the segmentation until a determination value indicative of a change amount of the region resulting from the segmentation becomes less than or equal to a predetermined threshold.

* * * * *